United States Patent [19]

Ells

[11] Patent Number: 4,795,132
[45] Date of Patent: Jan. 3, 1989

[54] SEALS

[75] Inventor: John W. Ells, Bexleyheath, England

[73] Assignee: The British Petroleum Company p.l.c., London, England

[21] Appl. No.: 6,281

[22] Filed: Jan. 20, 1987

Related U.S. Application Data

[63] Continuation of Ser. No. 663,753, Oct. 19, 1984, abandoned, which is a continuation of Ser. No. 370,080, Apr. 20, 1982, abandoned.

[30] Foreign Application Priority Data

Apr. 28, 1981 [GB] United Kingdom ................. 8113026

[51] Int. Cl.$^4$ .............................................. F16K 25/00
[52] U.S. Cl. ..................................... 251/159; 251/172
[58] Field of Search ....................... 251/159, 172, 174; 277/34.3, 34, 188 A, 188 R

[56] References Cited

U.S. PATENT DOCUMENTS

| | | | |
|---|---|---|---|
| 1,610,940 | 12/1926 | Friberg | 277/34 X |
| 2,099,722 | 11/1937 | Byers | 277/34 X |
| 2,370,751 | 3/1945 | Prager | 251/159 |
| 2,446,224 | 8/1948 | Frisby | 277/188 A |
| 3,043,469 | 7/1962 | Leach | 251/172 X |
| 3,110,470 | 11/1963 | Dumm | 251/159 |
| 3,140,902 | 7/1964 | Herbst | 277/188 R X |
| 3,186,702 | 6/1965 | Taylor | 277/188 A X |
| 3,261,613 | 7/1966 | Norick | 277/176 |
| 3,332,222 | 8/1967 | Smith | 277/34.3 |
| 3,359,999 | 12/1967 | Mueller | 251/174 X |
| 3,497,177 | 2/1970 | Hulsey | 251/172 |
| 3,711,062 | 1/1973 | Kirkwood | 251/172 |
| 3,749,357 | 7/1973 | Fowler | 251/172 |
| 4,094,516 | 6/1978 | Morley | 277/188 R X |
| 4,247,080 | 1/1981 | Morrison | 251/315 |
| 4,300,775 | 11/1981 | Riugel | 277/34.3 |

Primary Examiner—Martin P. Schwadron
Assistant Examiner—John C. Fox
Attorney, Agent, or Firm—Morgan & Finnegan

[57] ABSTRACT

A sealing assembly (20) for a ball valve comprises two non compressible and relatively movable members, for example the ball (24) and seal housing (26) of a ball valve, having located therebetween a sealing element (32) which is inflatable by the introduction of hydraulic fluid.

The sealing element (32) is located in a recess in member (26) so that when the hydraulic pressure is released the element (32) retracts into the recess to release the sealing engagement and facilitate the relative movement of members (24, 26). A resilient rubber ring (40) is provided to bias the seal housing (26) away from the position of sealing engagement to also facilitate movement of members (24, 26). A second sealing element (25) is also provided. Both elements are carried by the seal housing (26) which is in the form of an annular piston movable by the hydraulic fluid.

4 Claims, 3 Drawing Sheets

SEALS

This is a continuation of co-pending application Ser. No. 663,753, filed Oct. 19, 1984, abandoned, which is a continuation of co-pending application Ser. No. 370,080, filed Apr. 20, 1982 (now abandoned).

This invention relates to a sealing assembly more particularly to a sealing assembly for ball valves suitable for installation in oil and gas pipelines and to ball valves including same.

Ball valves are known and have been previously used in oil and gas pipelines. The valves comprise a body within which is a steel seal housing which compresses a sealing element of compressible material into engagement with the ball to effect the sealing. The compressible material of which the elements are made and the surface of the ball itself tend to be eroded, possibly in the case of a crude oil pipeline, by produced solids such as sand, and as a result to develop leaks. When a leak has developed it is frequently necessary to replace the entire valve. This operation is expensive since, in addition to the cost of the replacement ball valve, the system has to be closed down and the flow probably interrupted.

An improved sealing assembly has now been invented which is suitable for use not only in ball valves but also in other valves and which reduces the wear on the sealing element and facilitates operation of the valve.

According to the present invention there is provided a sealing assembly comprising two non compressible and relatively movable members having a sealing element located therebetween, the sealing element being operated by the pressure of hydraulic fluid to provide a seal between the two non compressible members, and wherein the sealing element is located in a recess in one of the non compressible members so that when the pressure of the hydraulic fluid is released the element retracts into the recess to release the sealing engagement and facilitate the relative movement of the non compressible members.

The sealing assembly can include a biasing means, such as a resilient rubber member or compression spring, to bias the sealing element away from the position of sealing engagement to further facilitate the relative movement of the non compressible members.

The sealing element can conveniently be a bag, made for example of rubber or the like, inflatable by the introduction of hydraulic fluid into sealing engagement with the non compressible members.

The sealing assembly can further include a second sealing element to provide a seal between the non compressible members, the second sealing element also being operable by the pressure of hydraulic fluid.

The first and second sealing elements can be located in a housing in the form of an annular piston operable by the hydraulic pressure.

The sealing assembly of the present invention is particularly suitable for employment where the movement of the non compressible members is such that the surface of one moves at right angles to normal to the two surfaces, for example where a ball rotates within a housing. In such a case, if the sealing elements engage the moving surface to any significant extent, they will be rapidly worn and also make it relatively difficult to move the ball or other member. The sealing assembly of the present invention reduces this problem.

Thus the present invention also provides a ball valve of the type used in oil and gas pipelines incorporating a sealing assembly as hereinbefore described.

The ball valve can include on its low pressure side one or more hydraulically operable sealing elements, the movement of which is in opposition to the seal(s) on the high pressure side and wherein a biasing means is provided on the low pressure side of the ball to bias the sealing element(s) away from the position of sealing engagement when the pressure of the hydraulic fluid is released.

The invention is illustrated by reference to the accompanying drawings in which three different embodiments are disclosed.

Of FIGS. 1-3, only FIG. 2 and FIG. 3 show the seal as now claimed.

Figure 1:
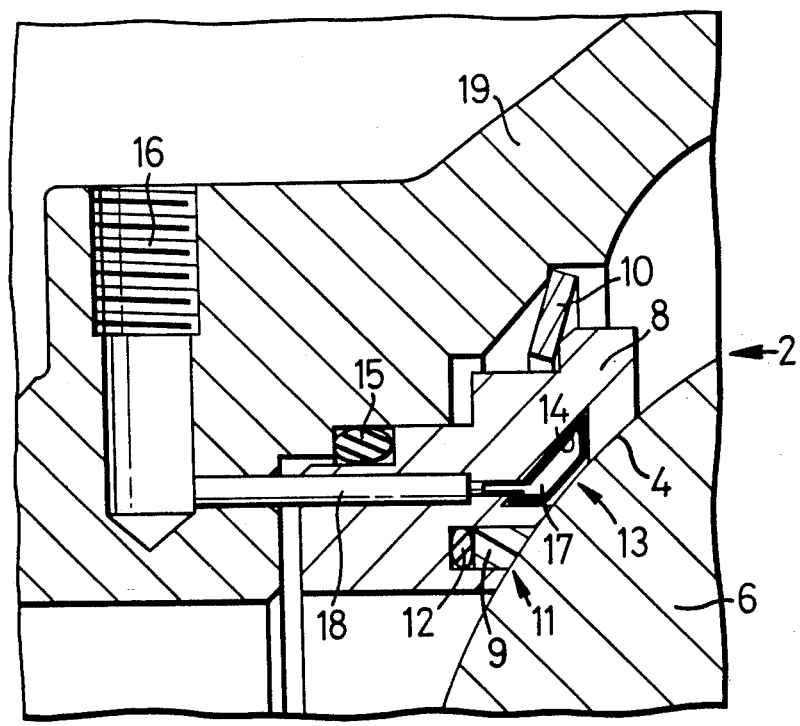
FIG. 1 is a partial vertical section of a ball valve including the sealing assembly.

Referring to FIG. 1 the sealing assembly indicated generally by numeral 2 comprises two non-compressible members provided by a steel ball 6 of a ball valve and a steel seal housing 8 (which is biased into engagement with the ball 6 by a flat steel compression spring 10). The sealing assembly further comprises a first seal 11 of conventional type comprising an element in the form of a ring 12 of compressible rubber and a polytetrafluoroethylene ring 9. In use, the ring 9 i urged into contact with the surface of the ball 6 by the spring-like action of rubber ring 12 and thereby provides a sliding seal against the surface of the ball 6 as the latter moves. Also shown in the drawing is a further conventional rubber O ring 15 to provide a seal between the seal housing 8 and a housing 19 for the ball.

Located on the low pressure side of the first seal 11 (although it could be located on the high pressure side), is an inflatable second seal 13 comprising an inflatable hollow circular tube 14 located in a cavity 17 in the seal housing 8 and to which hydraulic fluid can be supplied via inlet port 16 and bore 18. The second seal 13 is intended mainly for use when the ball valve is closed. In operation hydraulic fluid under pressure is supplied to the tube 14 to inflate same and provide a back up for the first seal by effecting a seal against small surface irregularities in the surfaces of the ball 6 or seal housing 8.

Prior to opening the ball valve the tube 14 is deflated by releasing the pressure on the hydraulic fluid and allowed to retract back into the cavity 17 in order to reduce both the wear on the tube and ball and the torque required to open the valve.

Figure 2:
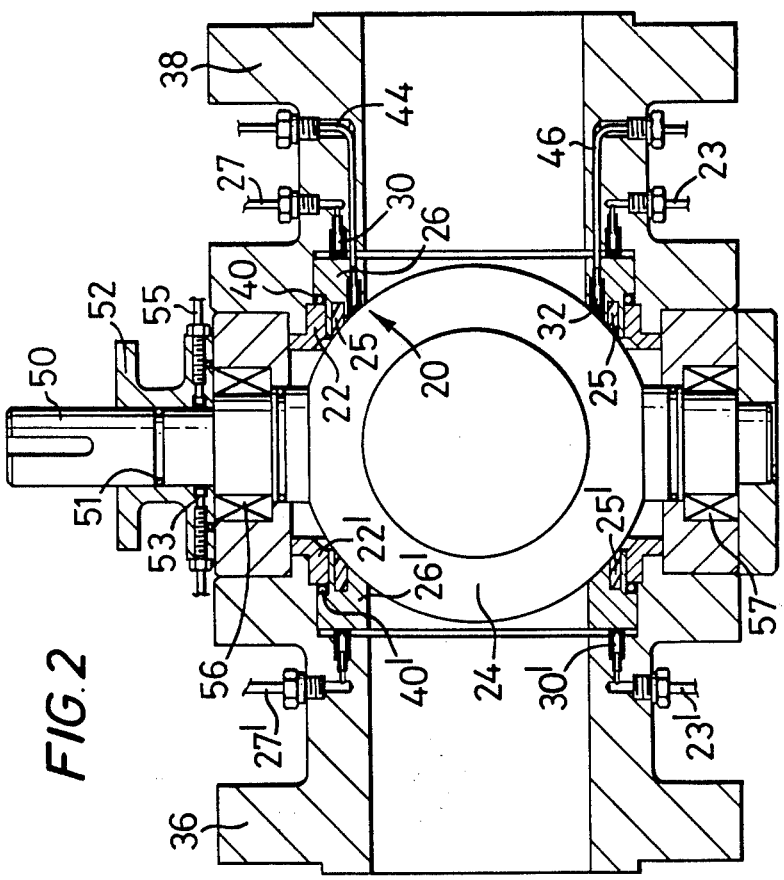
FIG. 2 is a vertical section of the entire ball valve assembly showing the ball valve in the closed position.

Referring to FIG. 2 the ball valve assembly as shown is suitable for location in a pipeline to which it is bolted by flanges 36 and 38, the right hand side being the high pressure side or upstream side and the left hand side the low pressure or downstream side. The sealing assembly indicated generally by numeral 20 comprises two non-compressible members provided by a steel ball 24 and a steel seal housing 26, the latter being in the form of an annular piston operable by means of hydraulic fluid introduced by lines 23 (line 27 being provided to bleed off air when the fluid is first introduced) to expandable annular chamber 30. The pressure of the hydraulic fluid causes the seal housing 26 to urge a nylon or plastic such as PTFE sealing element 25 against the ball 24.

The sealing assembly also includes an inflatable seal comprising a hollow inflatable circular tube 32 located in a cavity in the annular seal housing 26 and to which hydraulic fluid can be supplied via line 46 (line 44 being for initially bleeding air out). In the arrangement shown the inflatable seal is on the high pressure side of the sealing element 25, although their respective positions can be reversed.

Located between the housing 26 and retaining ring 22 is a resilient rubber O ring 40 which has the effect of biasing the housing 26 away from the ball 24 when the hydraulic pressure on the seals is released, to facilitate turning of the ball 24. A corresponding sealing assembly is provided on the low pressure side of the valve and is shown in FIG. 2 where the reference numerals with a prime correspond to those already mentioned. Thus for example 22' is the retaining ring on the low pressure side of the ball, and 40' is a resilient rubber O ring to bias the seal housing 26' away from ball 24.

In operation with the ball in the closed position as shown, hydraulic fluid under pressure is supplied to line 23 and to line 46, air having been previously bled from lines 27 and 44 respectively. Against the bias of resilient rubber ring 40, tube 32 is caused to inflate into sealing engagement with the ball 24 and seal 25 urged into sealing engagement with the ball 24. At the same time the seals on the low pressure side are also activated by the supply of hydraulic fluid via line 23' to chamber 30' to cause sealing element 25' into engagement with the ball 24 against the bias of ring 40' which is thereby compressed.

The ball 24 is moved by means of a valve actuating shaft 50 which is provided with a rubber O ring seal 51 between itself and housing 52 of the valve. Also acting on the shaft 50 is an inflatable seal 53 similar in construction to seal 32 and supplied with hydraulic fluid via line 55. The shaft 50 is movable on bearings 56 and 57. Lines 55, 27 and 44 communicate with a hydraulic fluid manifold (not shown).

Prior to opening the ball valve, the hydraulic pressure is reduced thus allowing sealing element 32 to contract and reducing the pressure urging seals 25 and 25' into engagement with the ball 24. The resilient rubber O rings 40 and 40' which have been compressed are allowed to expand and move the annular housings 26 and 26' away from the ball 24 to facilitate turning thereof, which can be done with substantially less torque than would otherwise be required.

The operation is a balanced one with the seals being released on both the high and low pressure sides simultaneously.

Figure 3:
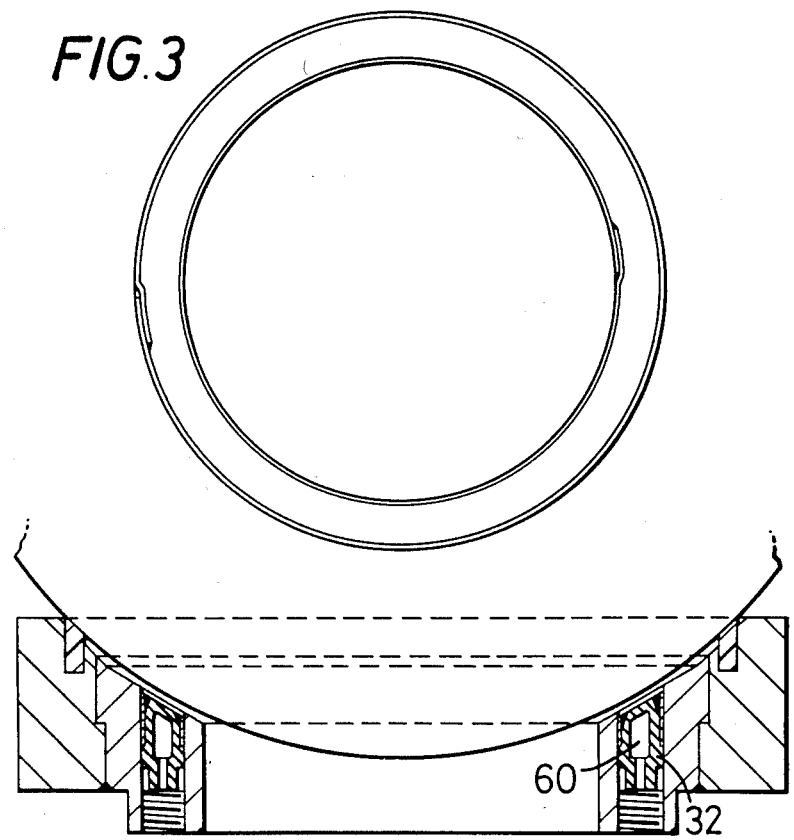
FIG. 3 is a partial vertical section on a larger scale than FIG. 2 showing the seals in more detail and FIG. 4 is a vertical section of a reinforced inflatable sealing element employed in the present invention.
Figure 4:
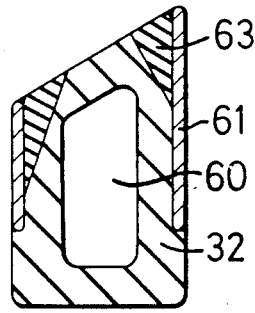

Referring to FIGS. 3 and 4 the inflatable sealing element comprises a soft rubber tube 32 defining a cavity 60 and having a stainless steel collar 61 to prevent extrusion. At the sealing end there is, interposed between the soft rubber 32 and sleeve 61, hard rubber wedges 63 to further assist in preventing extrusion.

The ball valve as described above including the sealing assembly is suitable for use with oil and gas pipelines where high pressures, typically of 1500 to 2500 psi are employed, and the useful life of the valve is prolonged.

I claim:

1. A ball valve sealing assembly comprising a ball valve element and a relatively moveable housing having a sealing element located between them, the sealing element defining a cavity and being inflatable by the introduction of hydraulic fluid into sealing engagement between the ball valve and the housing, the sealing element being located in a recess in the housing so that when the pressure of the hydraulic fluid on the sealing element is applied, the element expands out of the recess and when the pressure of the hydraulic fluid on the sealing element is released the element retracts completely into the recess to release the sealing engagement and facilitate the relative movement of the ball valve element and the housing, the sealing assembly comprising a line for the supply of hydraulic fluid to force the housing against the ball valve element, and biasing means to bias the housing away from the ball valve element to facilitate further the relative movement of the ball valve element and housing when the pressure of the hydraulic fluid on the housing is released.

2. A ball valve sealing assembly according to claim 1 comprising a second sealing element to provide a second seal between the ball valve element and the housing, the second sealing element also being operable by the pressure of hydraulic fluid.

3. A ball valve sealing assembly according to claim 2 wherein the second sealing element is a solid sealing element.

4. A ball valve sealing assembly according to claim 1 or 2 wherein the first and second sealing elements are in the form of annular pistons.

* * * * *